Figure 1:
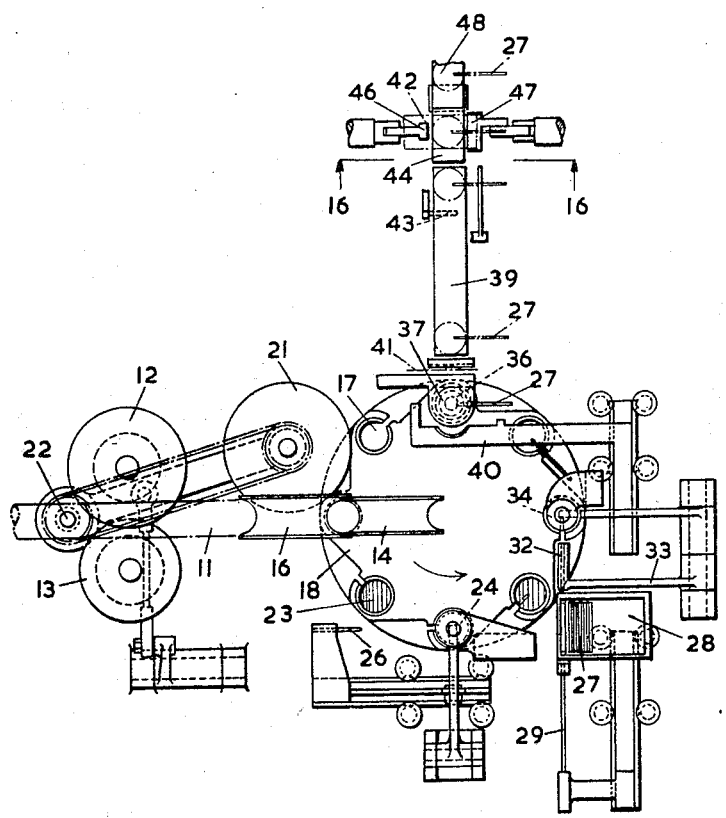

FIG. I.

LEONARD W. WAITE,
ARTHUR W. STAMP

LEONARD W. WAITE,
ARTHUR W. STAMP

LEONARD W. WAITE,
ARTHUR W. STAMP

Nov. 15, 1966  L. W. WAITE ET AL  3,285,199
PRODUCTION OF LOLLIPOPS OR LIKE SWEETS
Filed Sept. 19, 1963  12 Sheets-Sheet 6
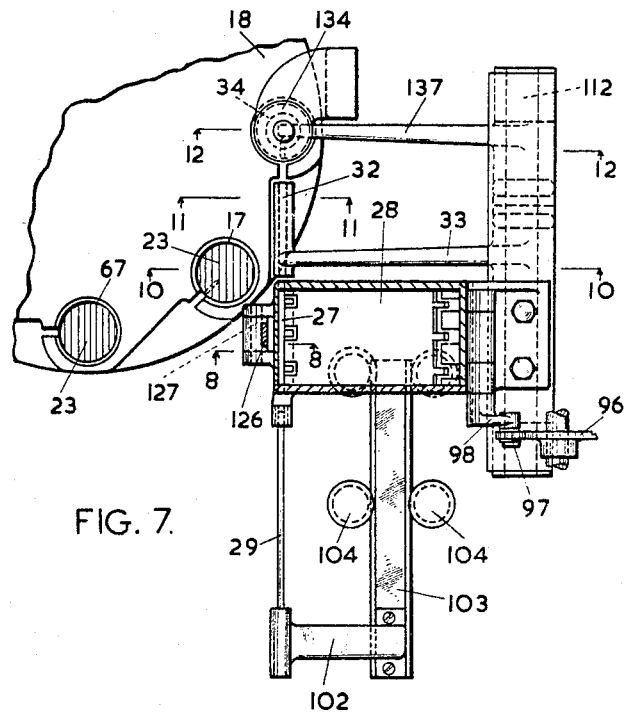
FIG. 7.
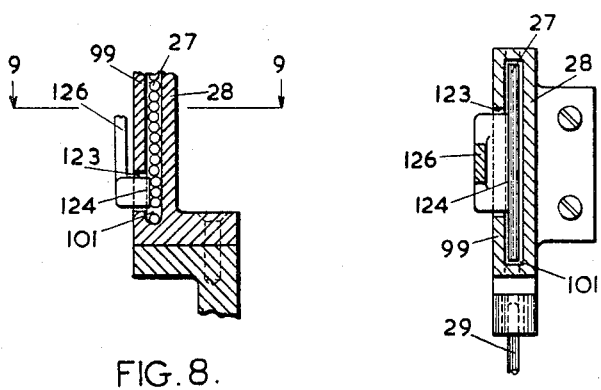
FIG. 8.
FIG. 9.
LEONARD W. WAITE,
ARTHUR W. STAMP Leonard W. Waite,
Arthur W. Stamp Nov. 15, 1966  L. W. WAITE ET AL  3,285,199
PRODUCTION OF LOLLIPOPS OR LIKE SWEETS
Filed Sept. 19, 1963  12 Sheets-Sheet 8

*Leonard W. Waite,*
*Arthur W. Stamp*

LEONARD W. WAITE,
ARTHUR W. STAMP

Nov. 15, 1966  L. W. WAITE ET AL  3,285,199
PRODUCTION OF LOLLIPOPS OR LIKE SWEETS
Filed Sept. 19, 1963  12 Sheets-Sheet 12

LEONARD W. WAITE,
ARTHUR W. STAMP

United States Patent Office 3,285,199
Patented Nov. 15, 1966

3,285,199
PRODUCTION OF LOLLIPOPS OR LIKE SWEETS
Leonard William Waite and Arthur William Stamp, Gainsborough, England, assignors to Rose Brothers (Gainsborough) Limited, Gainsborough, England, a British company
Filed Sept. 19, 1963, Ser. No. 310,050
Claims priority, application Great Britain, Sept. 22, 1962, 36,128/62; Feb. 4, 1963, 4,437/63
8 Claims. (Cl. 107—4)

This invention relates to the production of lollipops or like sweets, and in particular, wrapped lollipops, and has for an object the production of such articles directly from a rope of toffee, sugar confectionery or the like (referred to hereinafter as "toffee rope").

According to the present invention, lollipops or like sweets are formed by feeding a toffee rope axially downwardly in register with successive pockets of an intermittently movable conveyor as they are brought to rest at a feeding station for a leading portion of the rope to be received by each pocket in turn at that station, severing such portion from the rope while in the pocket to form an individual sweet, inserting sticks successively into the sweets thus formed at a subsequent station and transferring the sweets from the pockets in succession at a delivery station.

The finished sweets may be transferred axially from the successive pockets of the feed conveyor and then directly into successive pockets of a wrapping conveyor, a wrapper of paper, film, foil or other wrapping material being fed transversely of the path of movement of the sweets in advance of each transferring operation so as to be carried with the sweet into the pocket, the wrapper being folded about the forward face and the upper and lower faces of the sweet during such movement. The wrapping operations may then be completed at a subsequent station or stations through which the sweets are carried by the wrapping conveyor, and the wrapped sweets ejected from the conveyor pockets at a final delivery station.

Preferably, the toffee rope is fed by a pair of intermittently driven feeding and forming rollers towards successive waiting pockets of an intermittently driven conveyor, the severing action taking place during a dwell in the movement of the apparatus. The shape of the pockets of the conveyor correspond with the cross-sectional shape of the rope and are slightly larger to ensure free entry of the leading portion of the rope. The feed rollers are conveniently arranged for rotation about horizontal axes and lead the rope into a guiding tube arranged with its axis vertical and its lower end face disposed just sufficiently above the level of the conveyor, e.g., a feed wheel, to allow passage of a rotatable disc knife arranged to move transversely of the rope to sever the portion protruding from the guiding tube, the lower face of the tube acting as a ledger for the disc knife. The knife may be rotatably mounted on an arm arranged for oscillation to provide the motion of the knife, the latter operating to sever alternate lengths of rope on oscillating movements in opposite directions. The length of rope fed into each successive pock is conveniently somewhat less than the depth of the pocket so that the severed sweet falls below the upper surface of the conveyor as the severing action is completed.

To facilitate the insertion of the sticks (which may be formed from weak material such as stiff board or rolled paper), it is preferable to punch a hole in each lollipop by a reciprocating punch prior to the insertion of the stick. In such a case, to avoid movement of the lollipops in their pockets after the punching operation (as may possibly arise due to the jerking motion of the intermittently driven conveyor) which would result in the punched hole being out of line with the stick at the inserting station, there is preferably provided a compressor plunger arranged for reciprocation into and out of each pocket in turn, the plunger closely fitting the conveyor pocket so as to compress the successive sweets axially so that they expand radially to the size of the pockets, the compressing action conveniently taking place prior to or substantially simultaneously with the punching action. A second compressor plunger may be arranged at a station subsequent to the stick inserting station to perform a second compressing action to consolidate the stick.

When using a pocketed feed wheel rotatable about a vertical axis and a wrapping wheel disposed adjacent the feed wheel and rotatable about a horizontal axis, it is convenient to insert the sticks in a direction substantially tangential to the pitch circle of the pockets of the feed wheel, the wall of each pocket being formed with a tangential open-topped guide slot.

To avoid the tendency of sticks of such weak material to buckle as they are pressed home by the stick-inserting mechanism, there is preferably provided an upper guide, formed with an open tangential guide slot, movable into close proximity to a surface of the wheel, as it comes to rest at the stick-inserting station, to form with that surface a substantially enclosed guiding passage in alignment with the slot in the pocket wall, of such a shape as to confine a stick passing through the passage against any substantial lateral movement. The movable guide is conveniently mounted on a pivoted arm arrange to be rocked, e.g., by cam mechanism, upwardly after the insertion of each stick so as to remain clear of the stick as the wheel commences its next movement.

Figure 2:
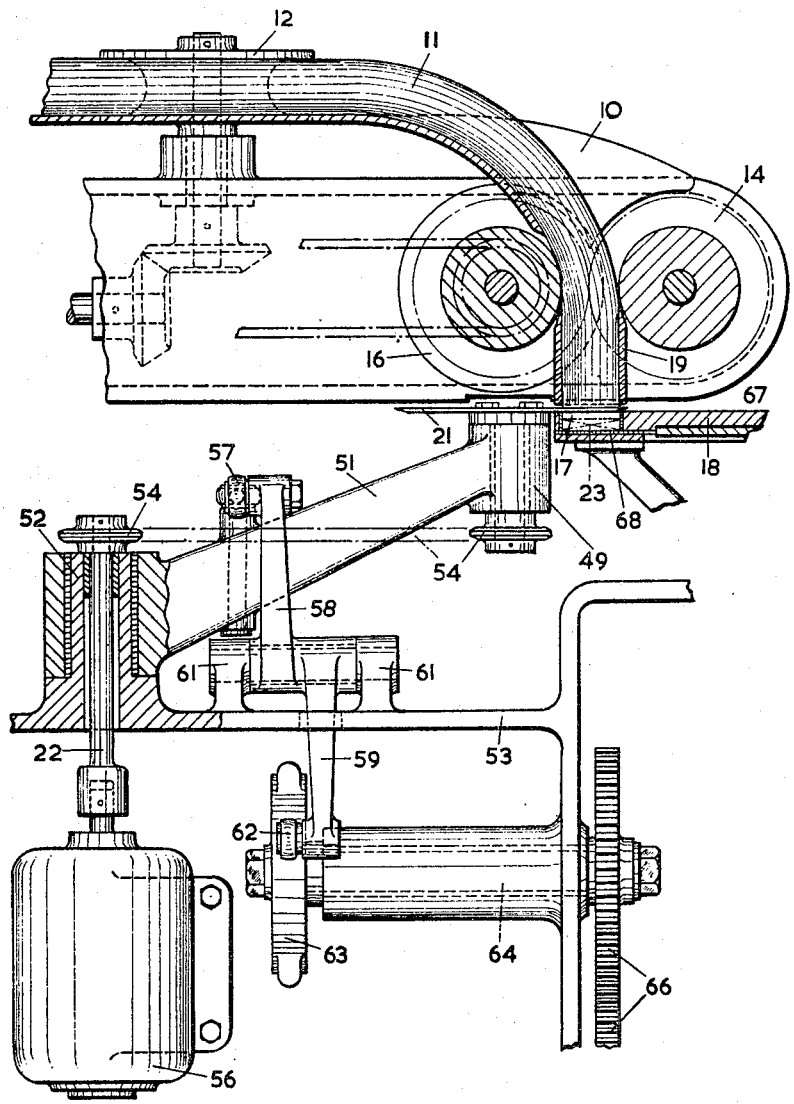
Figure 3:
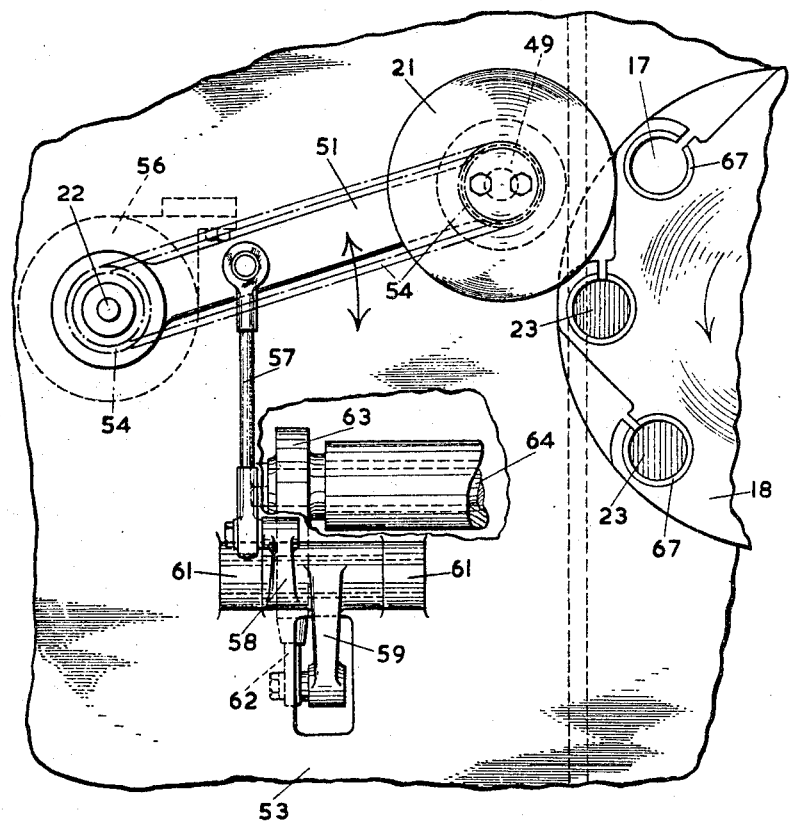
Figure 4:
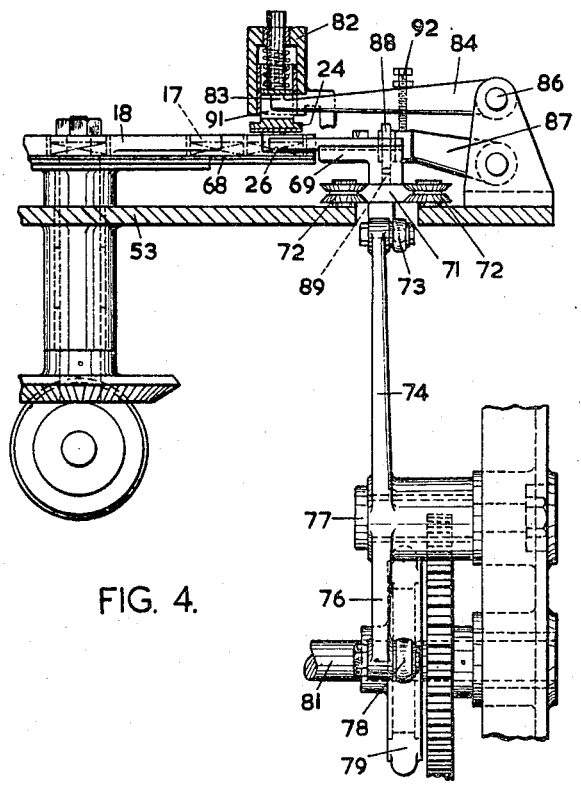
Figure 5:
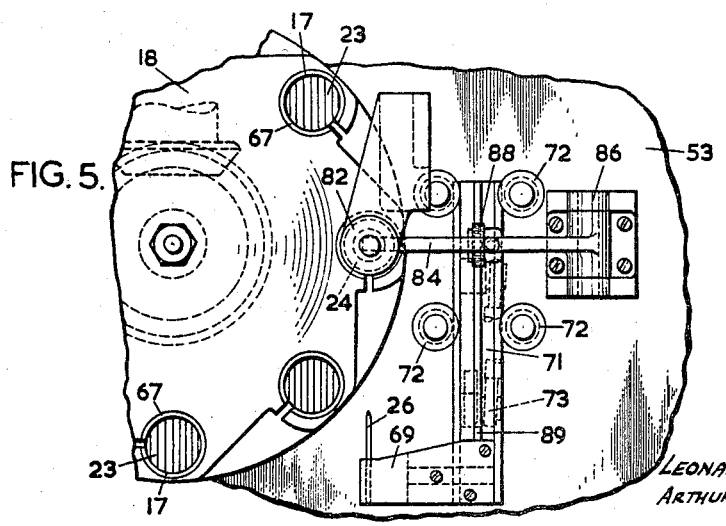
Figure 6:
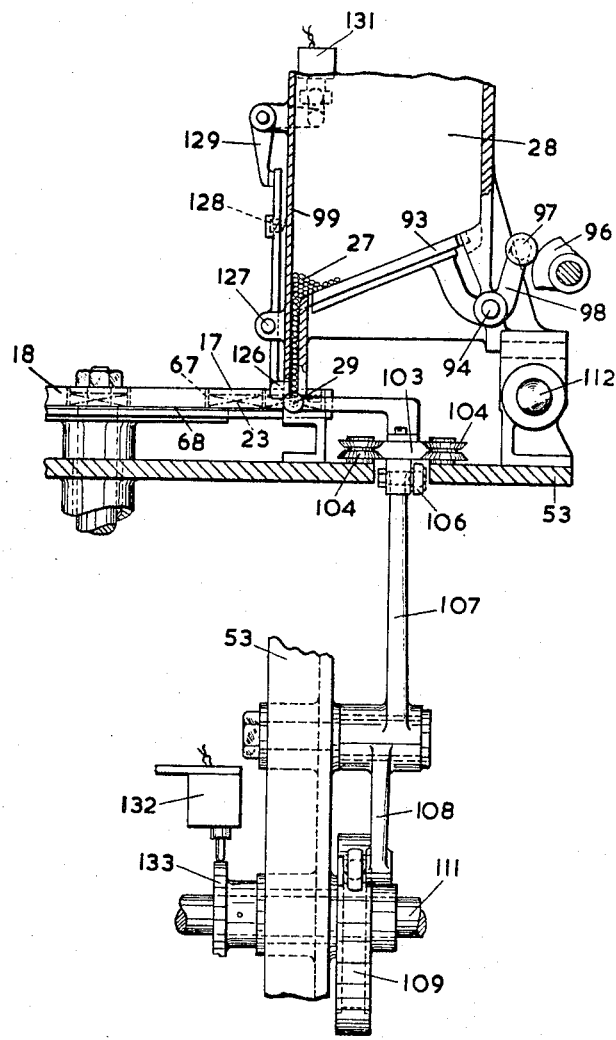
Figure 10:
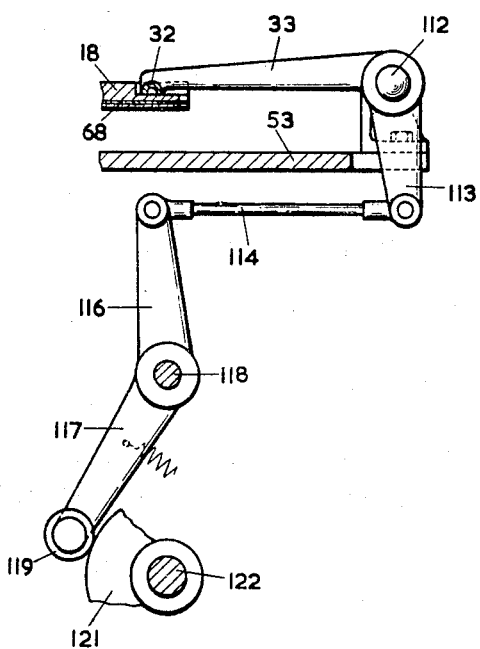
Figure 11:
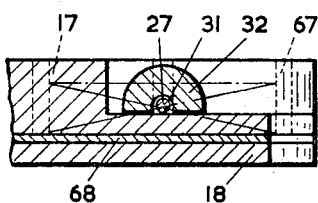
Figure 12:
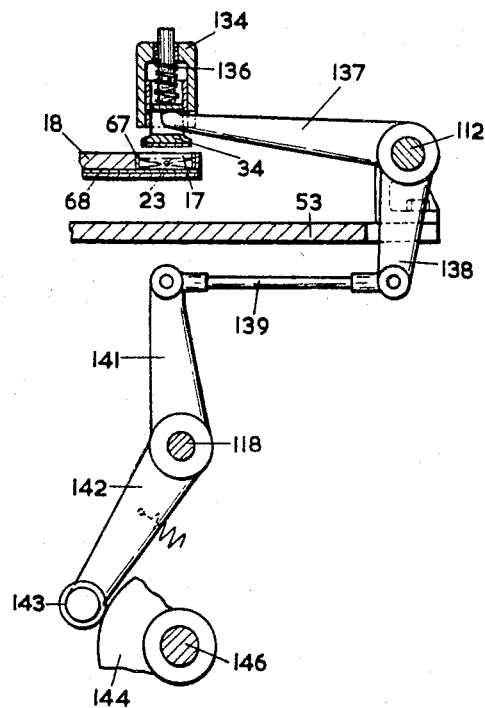
Figure 13:
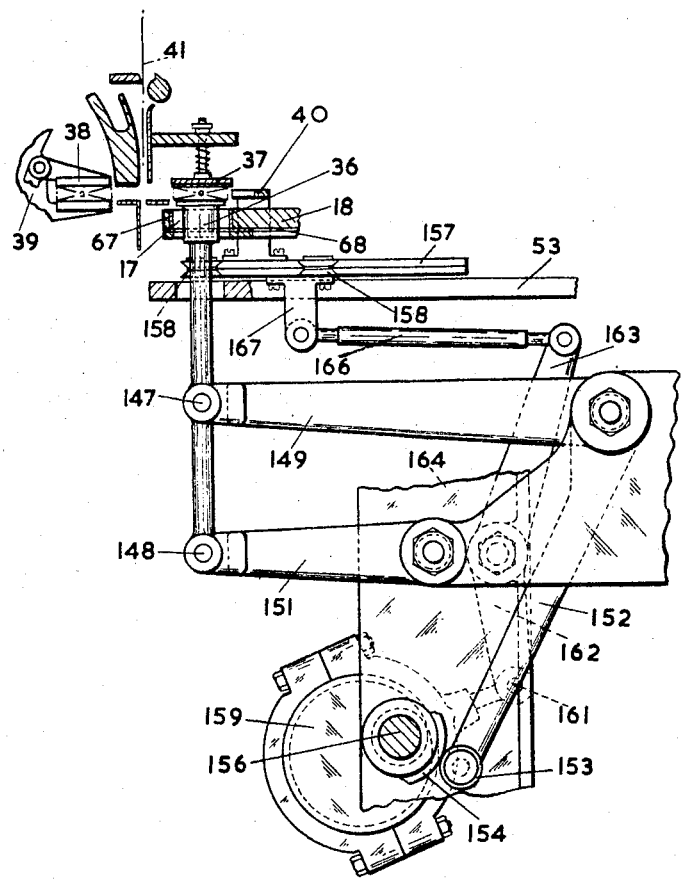
Figure 14:
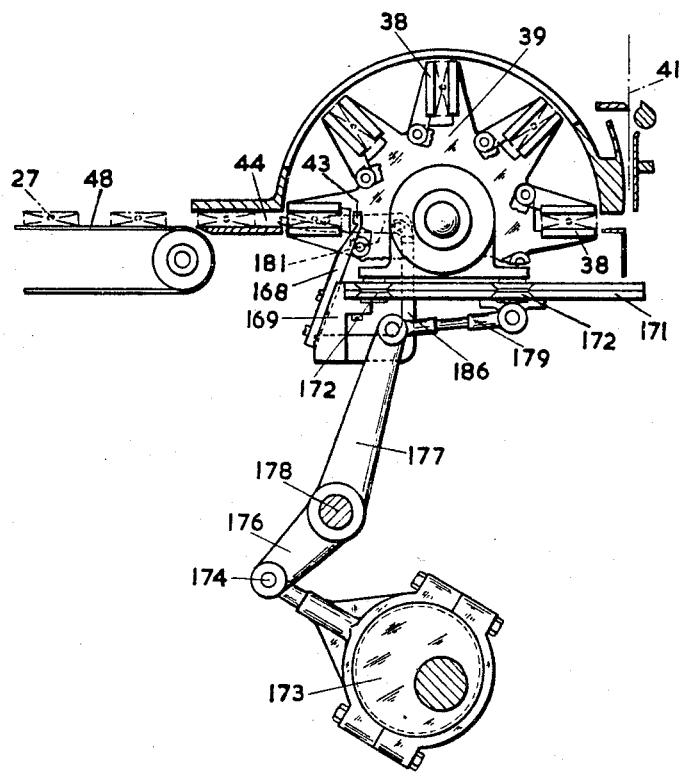
Figure 15:
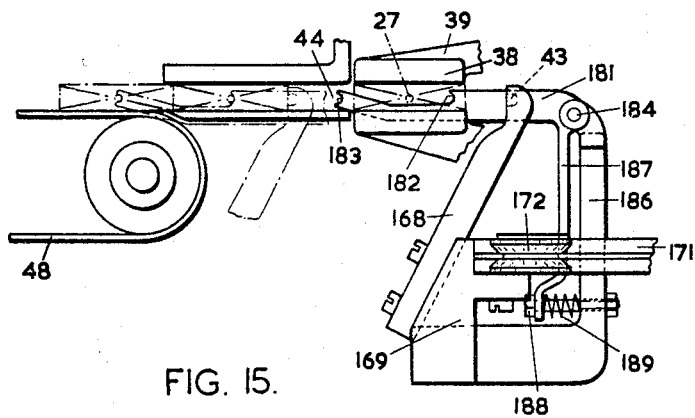
Figures 19, 20:
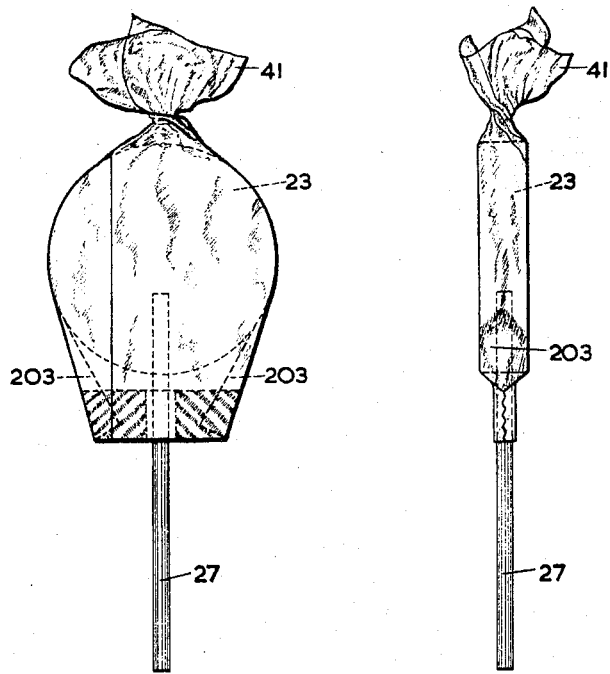
Figure 16:
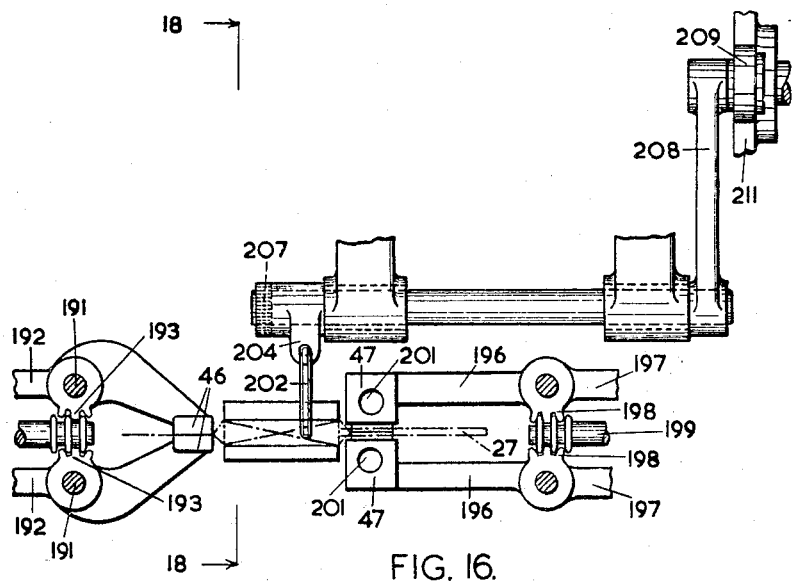
Figure 17:
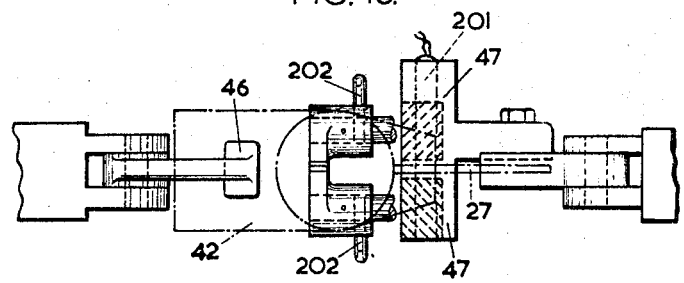
Figure 18:
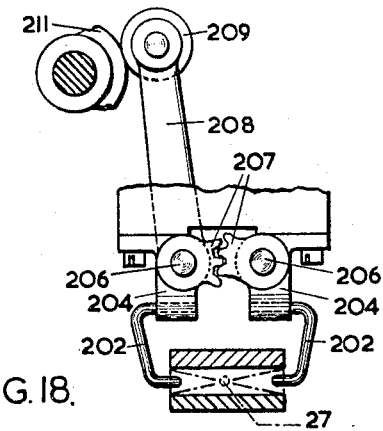

By way of example, the invention will now be described in greater detail with reference to the accompanying drawings in which FIGURE 1 is a diagrammatic plan showing the general lay-out of a machine for the production of wrapped lollipops, FIGURES 2 and 3 are an elevation and plan, respectively, of part of the machine showing the feeding and cutting station, FIGURES 4 and 5 are an elevation and plan, respectively, of part of the machine showing the punching and first compression station, FIGURES 6 and 7 are an elevation and plan, respectively, of part of the machine showing the stick-inserting and second compression station, FIGURE 8 is a sectional detail on the line 8—8 in FIGURE 7, FIGURE 9 is a sectional detail on the line 9—9 in FIGURE 8, FIGURE 10 is a sectional detail on the line 10—10 in FIGURE 7, FIGURE 11 is a sectional detail on the line 11—11 in FIGURE 7, drawn to a larger scale, FIGURE 12 is a sectional detail on the line 12—12 in FIGURE 7, FIGURE 13 is an elevation of part of the machine showing the ejecting and transfer station, FIGURE 14 is an elevation of part of the machine showing the wrapping and delivery station, FIGURE 15 is a detail of the apparatus shown in FIGURE 14, drawn to a larger scale, FIGURE 16 is a sectional detail of the apparatus at the wrapping and delivery station, taken on the line 16—16 in FIGURE 1 and drawn to a larger scale, FIGURE 17 is a plan of the apparatus shown in FIGURE 16, FIGURE 18 is a sectional detail on the line 18—18 in FIGURE 16, and FIGURES 19 and 20 are an elevation and end view of the package produced by the apparatus shown in FIGURES 1 to 18.

A freshly formed rope 11 of toffee is received by a pair of shaped rollers 12 and 13 which are intermittently driven and forward the rope 11 over a guide chute 10 into the nip of a pair of similarly shaped rollers 14 and 16 which are intermittently driven and cause the rope 11 to change direction so that its axis lies vertically in register with pockets 17 in an intermittently rotatable feed wheel 18 as the pockets 17 are successively brought to rest at a feeding and cutting station. The leading end of the rope 11 is guided into the pocket 17 for the time being at rest at the feeding and cutting station by a tube 19 having its lower end face disposed just sufficiently above the upper surface of the wheel 18 to allow passage of a rotatable disc knife 21 arranged to oscillate about the axis of a shaft 22 to sever the portion of the rope 11 protruding from the tube 19, the lower face of the tube 19 acting as a ledger for the knife 21. The length of rope 11 fed into the pocket 17 is somewhat less than the depth of the pocket so that the severed sweet 23 falls below the upper surface of the feed wheel 18 as the severing action is completed, thus allowing the knife 21 to move clear of the upper surface of the feed wheel 18 while at the same time allowing a sweet 23 to be produced that does not protrude from the pocket 17, or which lies below the surface of the wheel 18.

As each sweet 23 is severed and deposited into the pocket 17 as described above, the wheel 18 moves to carry the sweet 23 firstly to an idle station and then to a punching and first compression station. At that station a spring-loaded compressor plunger 24 first moves downwardly into engagement with the upper surface of the sweet 23 so as to compress the sweet axially sufficient to cause it to expand radially to the size of the pocket 17. While so compressed, a punch 26 is caused to pass into the sweet 23 to form a hole to facilitate the subsequent insertion of a stick 27 to complete the lollipop, the plunger 26 being arranged to reciprocate on an axis substantially tangential to the pitch circle of the pockets 17.

After retraction of the plunger 26 and lifting of the compressor 24, the wheel 18 again moves to a further idle station and then to a stick-inserting station at which a stick 27 is pushed from the base of a magazine 28 by a pusher 29 through a guideway 31 into the hole in the sweet 23 formed by the punch 26. The lower portion of the guideway 31 is constituted by a surface of the wheel 18 while the upper portion 32 is formed in a pivoted arm 33. After insertion of the stick 27, a second compressor 34 is spring-urged into contact with the upper surface of the sweet 23 to consolidate the stick 27.

With the stick 27 thus inserted and the pusher 29 retracted, the upper portion 32 of the guideway 31 and the compressor 34 are raised to clear the stick 27 during further movement of the wheel 18 to carry the sweet 23 to a further idle station and then to an ejecting station at which an ejecting pusher 36 passes upwardly through the pocket 18 to raise the lollipop into nipping engagement with a spring-loaded upper guide plate 37 forming with the upper face of the pusher 36 a guiding channel in alignment with a waiting pocket 38 of a wrapping wheel 39 of known construction and function, the lollipop then being transferred by a reciprocating transfer pusher 40 with a wrapper 41 (fed in the meantime in known manner into the path to be taken by the lollipop) into the waiting pocket 38, the wrapper 41 being formed into a tube 42 during subsequent movement of the wrapping wheel 39.

The partially wrapped lollipop is then removed from the pocket 38 of the wheel 39 by a reciprocating delivery pusher 43 which ejects the lollipop into a delivery channel 44, and while there, opposite ends of the tube 42 are closed by twisting grippers 46 and crimping jaws 47, respectively, the wrapped lollipop finally being removed from the channel 44 onto a delivery band 48 by the next succeeding lollipop.

The various mechanisms for performing the above functions will now be described.

Cutting mechanism

The knife 21 is rotatably mounted in a bearing 49 formed in an arm 51 pivotally mounted for oscillating movement on a bearing 52 upstanding from the main framework 53 of the machine and serving also rotatably to support the shaft 22. The knife 21 is driven by chain and sprocket gearing 54 from the shaft 22 itself driven by a motor 56 mounted on the framework 53. The arm 51 is oscillated by a pivoted link 57 connected at one end to the arm 51 and at the other to one arm 58 of a two-armed lever 58, 59 pivotally mounted in bearings 61 formed on the framework 53, the other arm 59 of the lever 58, 59 being pivotally connected to a rod 62 extending from an eccentric mechanism 63 mounted on a shaft 64 rotatably mounted in the framework 53 and driven by gearing 66. The oscillating motion of the knife 21 is so timed in relation to the movements of the wheel 18 as to sever one sweet 23 from the rope 11 upon movement in one direction and another in the opposite direction. The pockets 17 of the wheel 18 are each lined with an annulus 67 of polytetrafluoroethylene, while the bases of the pockets are constituted by a stationary annulus 68 of the same material.

Punching and first compression

The punch 26 is carried by a bracket 69 extending laterally from a slide bar 71 mounted for reciprocation between grooved rollers 72 rotatably mounted in the framework 53, the bar 71 being connected by a pivoted link 73 to one arm 74 of a two-armed lever 74, 76, pivotally mounted on a stud 77, the other arm 76 of the lever being pivotally connected to a rod 78 extending from an eccentric mechanism 79 mounted on a shaft 81 driven in timed relationship with the wheel 18.

The compressor plunger 24 is slidably mounted in a housing 82 attached to the framework 53 and is actuated by a tappet 83 formed on an arm 84 pivoted at 86 and oscillated in time relationship with the wheel 18 by an arm 87 carrying a roller 88 arranged to engage a ramp 89 formed on the slide bar 71, the tappet 83 passing into a slot 91 formed in the plunger 24. Precise adjustment of the stroke of the plunger 24 is obtained by a screw 92 mounted in the arm 84 and engaging the arm 87.

Stick-insertion and second compression

The sticks 27 are contained in the magazine 28 which has its base 93 pivoted at 94 and arranged to be oscillated to agitate the sticks by a rotatable cam 96 engaging a roller 97 carried by an arm 98 extending from the base 93. The front wall 99 of the magazine 28 is formed with a delivery channel 101 the base of which forms a guide for the lowermost stick in the channel. The sticks are removed from the magazine 28 in succession by the pusher 29 which is carried by a bracket 102 extending laterally from a slidebar 103 mounted for reciprocation in grooved rollers 104 freely mounted in the framework 53. The slidebar 103 is connected by a pivoted link 106 to one arm 107 of a two-armed lever 107, 108 pivotally mounted in the framework 53 and having its other arm 108 pivotally connected to an eccentric mechanism 109 carried by a shaft 111 rotatably mounted in the framework 53 and driven in timed relationship with the wheel 18. The pusher 29 passes along the base of the delivery channel 101 to eject the stick 27 through the guideway 31 into the sweet 23. The arm 33 containing the upper portion 32 of the guideway 31 is pivotally mounted on a shaft 112 on the framework 53 and is formed with an extension 113 pivotally conected by a link 114 to one arm 116 of a two-armed lever 116, 117, pivotally mounted on a shaft 118, the other arm 117 of the lever carrying a roller 119 arranged to engage the face of a rotatable cam 121 mounted on a shaft 122 and driven in timed relationship with the wheel 18.

The front wall 99 of the magazine 28 is formed with a slot 123 for the passage of the nose 124 of a gripper member 126 pivotally mounted at 127 on the wall 99 and urged by a spring 128 towards gripping position where the nose 124 nips the stick 27 next to the one in the base of the channel 101 against the wall of the channel so as to prevent all but the leading stick 27 from falling into the base. In this manner, the lowermost stick 27 can be removed from the channel 101 without interference with the next succeeding stick. The gripper member 126 is oscillated by a lever 129 actuated by a solenoid 131 controlled by a switch 132 operated by a cam 133 in timed relationship with the movement of the pusher 29.

The second compressor 34 is slidably mounted in a hub 134 and urged by a spring 136 towards the wheel 18 the compressor 34 being lifted at intervals by an arm 137 pivotally mounted on the shaft 112 and formed with an extension 138 pivotally connected by a link 139 to one arm 141 of a two-armed lever 141, 142 pivotally mounted on the shaft 118, the other arm 142 carrying a roller 143 arranged to engage a cam 144 mounted on the shaft 146.

Ejecting and transfer mechanism

The ejecting pusher 36 is pivotally attached at 147 and 148 to arms 149 and 151, the arm 149 being provided with an extension 152 carrying a roller 153 arranged to engage a rotatable cam 154 mounted on a shaft 156. The operating radii of the arms 149 and 151 are such that the operating face of the pusher 36 remains substantially parallel to the plane containing the bases of the pockets 17.

The transfer pusher 40 extends laterally from a slide bar 157 mounted for reciprocation between grooved rollers 158 freely mounted on the framework 53. The slide bar 157 is reciprocated by an eccentric mechanism 159 pivotally attached at 161 to one arm 162 of a two-armed lever 162, 163, pivotally mounted at 164 in the framework 53, the other arm 163 of the lever being pivotally connected to one end of a link 166 the other end of which is pivotally connected to a block 167 depending from the slide bar 157.

Wrapping and delivery mechanism

The pusher 43 extends laterally from a support 168 secured to a block 169 which is secured to the underside of a slide bar 171 mounted for reciprocation between grooved rollers 172 freely mounted on the framework 53. The slide bar 171 is reciprocated by an eccentric mechanism 173 pivotally attached at 174 to one arm 176 of a two-armed lever 176, 177, pivoted at 178, the other arm 177 of the lever being connected by a pivoted link 179 to the underside of the slide bar 171.

To ensure that the lollipops pass into the delivery channel 44 and on to the belt 48 with their sticks extending substantially parallel to each other, an auxiliary pushing member 181 having two notches 182 and 183 is pivotally mounted at 184 on an extension 186 of the block 169, the member 181 being formed with a tail piece 187 by which the member is urged towards operative position against a stop 188 by a spring 189. The notches 182 and 183 are spaced apart by the nominal pitch of the lollipops when touching each other as one is removed from the channel 44 by the succeeding one, the notches 182 and 183 serving to re-position the sticks 27 in the event that they have slewed during the discharging operations.

The twisting grippers 46 are pivotally mounted on shafts 191, carried by rods 192, and are each formed with arcuate rack teeth 193 arranged to be engaged by a reciprocating rack member 194 to open and close in timed relationship with the pusher 43. The rods 192 are mounted on a rotatable block (not shown) arranged to oscillate in known manner to provide the twisting action.

The crimping jaws 47 (split transversely to clear the sticks) are pivotally mounted on shafts 196, mounted in supporting rods 197, and are provided with arcuate rack teeth 198 arranged to be engaged by a reciprocating rack member 199 to open and close to produce the crimping action. The wrappers 41 in this example are of heat-sealing material, and the jaws 47 are provided with heating elements 201 so as to seal the crimped portions by heat and pressure.

A pair of tuckers 202 are arranged to operate to form side tucks 203 prior to the operation of the jaws 47, the tuckers 202 being carried by blocks 204 pivoted at 206 and formed with arcuate rack teeth 207 in engagement with each other, one of the blocks 204 being provided with an arm 208 carrying a roller 209 arranged to engage a rotatable cam 211 to open and close the tuckers 202.

We claim:
1. Method of producing lollipops or like sweets, comprising feeding a rope of toffee axially downwardly in register with successive pockets of an intermittently rotatable pocketed feed wheel as the pockets are successively brought to rest at a feeding station for a leading portion of the rope to be received by each pocket in turn at that station, severing such portion from the rope while in the pocket to form an individual sweet, inserting sticks successively into the sweets thus formed at a subsequent station, punching a hole in each lollipop in the direction of stick-insertion prior to the insertion of each stick, applying pressure to each lollipop in turn to cause it to expand radially to the size of the pocket, the compressing action taking place prior to or substantially simultaneously with the punching action, and transferring the sweets from the pockets in succession at a delivery station, the sticks being inserted in a direction substantially tangential to the pitch circle of the pockets of the feed wheel.

2. Method of producing lollipops or like sweets, comprising feeding a rope of toffee axially downwardly in register with successive pockets of an intermittently rotatable pocketed feed wheel as the pockets are successively brought to rest at a feeding station for a leading portion of the rope to be received by each pocket in turn at that station, severing such portion from the rope while in the pocket to form an individual sweet, inserting sticks successively into the sweets thus formed at a subsequent station, punching a hole in each lollipop in the direction of stick-insertion prior to the insertion of each stick, the sticks being inserted in a direction substantially tangential to the pitch circle of the pockets of the feed wheel, applying pressure to each lollipop in turn to cause it to expand radially to the size of the pocket, the compressing action taking place prior to or substantially simultaneously with the punching action, applying further pressure to each lollipop in turn subsequently to the insertion of the stick, and transferring the sweets from the pockets in succession at a delivery station.

3. Apparatus for producing lollipops or like sweets, comprising a pair of feeding and forming rollers for forwarding a rope or toffee, a pocketed feed wheel rotatable about a vertical axis, means for driving the feed wheel intermittently, means for driving said rollers intermittently in timed relationship with the feed wheel for a leading portion of the rope to be received by each pocket of the feed wheel in turn, a driving shaft, an arm pivotally mounted for movement about the axis of said driving shaft, a disc knife rotatably mounted in said arm, means for oscillating said arm to cause the knife repeatedly to move transversely of the rope to sever such portions successively as they are received by the successive pockets, the severing action taking place during a dwell in the movement of the apparatus, means for timing said oscillating means with respect to the feeding and forming roller driving means as to cause the knife to sever alternate lengths of rope on oscillating movements in opposite directions, means for inserting sticks successively into the sweets thus formed at a subsequent station and means for transferring the sweets from the pockets in succession at a delivery station, the stick-inserting means being so constructed and arranged that the sticks are inserted in a direction substantially tangential to the pitch circle of the pockets of the feed wheel.

4. Apparatus as in claim 3, wherein an upper guide is disposed at the stick-inserting station and formed with an open tangential guide slot, the upper guide being movable into close proximity to a surface of the wheel, as it comes to rest at the stick-inserting station, to form with that surface a substantially enclosed guiding passage in alignment with the slot in the pocket wall, of such a shape as to confine a stick passing through the passage against any substantial lateral movement.

5. Apparatus as in claim 4, wherein the movable guide is mounted on a pivoted arm arranged to be rocked, e.g., by cam mechanism, upwardly after the insertion of each stick so as to remain clear of the stick as the wheel commences its next movement.

6. Apparatus for producing lollipops or like sweets comprising a pair of feeding and forming rollers for forwarding a rope of toffee, at least one pair of further forwarding rollers rotatable about substantially horizontal axes, a guiding tube arranged with its axis substantially vertical into which the rope is led by the forwarding rollers, a pocketed feed wheel rotatable about a vertical axis, means for driving the feed wheel intermittently, means for driving said rollers intermittently in timed relationship with the feed wheel for a leading portion of the rope to be received by each pocket of the feed wheel in turn, a driving shaft, an arm pivotally mounted for movement about the axis of said driving shaft, severing means mounted on said arm, means for oscillating said arm to cause the knife repeatedly to move transversely of the rope to sever such portions successively as they are received by the successive pockets, the severing action taking place during a dwell in the movement of the apparatus, means for timing said oscillating means with respect to the feeding and forming roller driving means as to cause the severing device to sever alternate lengths of rope on oscillating movements in opposite directions, means for inserting sticks successively into the sweets thus formed at a subsequent station, means for transferring the sweets from the pockets in succession at a delivery station, the stick-inserting means being so constructed and arranged that the sticks are inserted in a direction substantially tangential to the pitch circle of the pockets of the feed wheel, a pocketed wrapping wheel disposed adjacent the feed wheel and rotatable about a horizontal axis, said transferring means transferring the sweets laterally from the successive pockets of the feed wheel and then directly into successive pockets of the wrapping wheel and means for feeding a wrapper transversely of the path of movement of the sweets in advance of each transferring operation so that the wrapper is carried by the sweet into the pocket of the wrapping wheel, the wrapper being folded about the forward face and the upper and lower faces of the sweet during such movement.

7. Apparatus as in claim 6, wherein an upper guide is disposed at the stick-inserting station and formed with an open tangential guide slot, the upper guide being movable into close proximity to a surface of the wheel, as it comes to rest at the stick-inserting station, to form with that surface a substantially enclosed guiding passage in alignment with the slot in the pocket wall, of such a shape as to confine a stick passing through the passage against any substantial lateral movement.

8. Apparatus as in claim 7, wherein the movable guide is mounted on a pivoted arm arranged to be rocked, e.g., by cam mechanism, upwardly after the insertion of each stick so as to remain clear of the stick as the wheel commences its next movement.

References Cited by the Examiner
UNITED STATES PATENTS

| | | | |
|---|---|---|---|
| 583,024 | 5/1897 | Boyer | 107—69 |
| 1,147,402 | 7/1915 | Igou | 53—113 |
| 1,689,879 | 10/1928 | Krout | 107—8.1 |
| 1,692,559 | 11/1928 | Miller | 107—8.1 |
| 1,839,719 | 1/1932 | Walter | 107—70 X |
| 2,005,854 | 6/1935 | Davis et al. | 107—54 X |
| 2,637,281 | 5/1953 | Latini et al. | 107—8 |
| 2,705,857 | 4/1955 | Fox et al. | 107—8.1 |

WALTER A. SCHEEL, *Primary Examiner.*

WILLIAM I. PRICE, *Examiner.*

J. SHEA, *Assistant Examiner.*